(12) United States Patent
Koo et al.

(10) Patent No.: US 10,286,851 B2
(45) Date of Patent: May 14, 2019

(54) STORAGE APPARATUS FOR MOBILITY DEVICE IN VEHICLE

(71) Applicants: HYUNDAI MOTOR COMPANY, Seoul (KR); KIA MOTORS CORPORATION, Seoul (KR)

(72) Inventors: Dong Han Koo, Seoul (KR); Seok Won Lee, Uiwang Si (KR); Jae Young Choi, Seongnam-si (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 55 days.

(21) Appl. No.: 15/711,639

(22) Filed: Sep. 21, 2017

(65) Prior Publication Data
US 2018/0186296 A1 Jul. 5, 2018

(30) Foreign Application Priority Data

Jan. 4, 2017 (KR) .......................... 10-2017-0001535

(51) Int. Cl.
*B60R 7/04* (2006.01)
*B60R 13/02* (2006.01)
*B60R 7/08* (2006.01)
*B60R 11/00* (2006.01)

(52) U.S. Cl.
CPC ............... *B60R 7/046* (2013.01); *B60R 7/08* (2013.01); *B60R 11/00* (2013.01); *B60R 13/0243* (2013.01); *B60R 2011/0021* (2013.01); *B60R 2011/0085* (2013.01)

(58) Field of Classification Search
CPC .......... B60J 5/04; B60J 5/0416; B60R 7/046; B60R 7/08; B60R 11/00; B60R 13/0243
USPC ........................ 296/37.12, 152, 146.5, 146.7
See application file for complete search history.

(56) References Cited

U.S. PATENT DOCUMENTS 5,800,004 A * 9/1998 Ackeret .................. B60R 7/046
224/915
2018/0186295 A1* 7/2018 Akdag Cakir .......... B60R 7/046

FOREIGN PATENT DOCUMENTS

DE 102014201566 A1 * 7/2015 ............. B60R 7/046

* cited by examiner

*Primary Examiner* — Jason S Daniels
(74) *Attorney, Agent, or Firm* — Brinks Gilson & Lione (57) ABSTRACT

The present disclosure provides a storage apparatus for a mobility device in a vehicle, wherein the mobility device is stored in a vehicle door and the mobility device can be taken out directly from the vehicle door by maintaining the tilted state of the mobility device.

16 Claims, 8 Drawing Sheets

STORAGE APPARATUS FOR MOBILITY DEVICE IN VEHICLE

CROSS REFERENCE TO RELATED APPLICATION

The present application claims priority to and the benefit of Korean Patent Application No. 10-2017-0001535, filed on Jan. 4, 2017, which is incorporated herein by reference in its entirety.

FIELD

The present disclosure relates to a storage apparatus for mobility device in a vehicle that stores an electric personal mobility device therein.

BACKGROUND

The statements in this section merely provide background information related to the present disclosure and may not constitute prior art.

Due to environmental pollution problems and the increase of leisure activities, the development of a single-person vehicle called a personal mobility device has been increased.

An example of an electric personal mobility device that uses a motor as its power source is a Segway and an electric kickboard.

In particular, a foldable electric kickboard can be loaded in a back seat or trunk space of a vehicle.

However, even when folded, the volume is still large enough to take up much space in the trunk or in the back seat.

In addition, when a user wants to get the loaded electric personal mobility device out, it may cause inconvenience because he or she has to bend over at the waist level to take out the heavy electric personal mobility device.

SUMMARY

The present disclosure provides a storage apparatus for a mobility device in a vehicle where an electric personal mobility device is stored in a vehicle door, thereby improving user convenience in a way that the electric personal mobility device is easily removed from the vehicle door.

In one form of the present disclosure, a storage apparatus for mobility device in a vehicle, the apparatus including: a door having a storage space therein; a sliding frame provided in the storage space configured to slide in a lateral direction and configured to close the storage space; a tilting frame provided at the sliding frame that is configured to tilt in a vertical direction, wherein the tilting frame is loaded with the mobility device; and a locking mechanism provided at the sliding frame and connected to the tilting frame, the locking mechanism configured to lock the tilting frame such that a tilting motion of the tilting frame is restricted, and when the sliding frame is drawn out of the storage space, unlock the tilting frame corresponding to movement of the sliding frame such that the tilting motion of the tilting frame is allowed.

The tilting frame may be provided such that the center of the tilting frame is positioned at an end of the sliding frame.

The storage space may include a guide slot extending in the lateral direction, and the sliding frame may include: a slide leg provided at the guide slot that is configured to slide, wherein the slide leg is provided with the locking mechanism; and a slide casing coupled to the slide leg and configured to cover the storage space.

The guide slot may be provided with a first elastic spring connected to the slide leg, and wherein the guide slot is configured to elastically hold the slide leg in a direction that the slide leg is drawn out.

The locking mechanism may include: a guide bar configured to move along the slide leg, wherein the guide bar is locked to the guide slot when the sliding frame is drawn out; and a locking hook rotatably provided at the slide leg and being connected to the guide bar, wherein the locking hook is configured to engage or disengage the tilting frame corresponding to a rotation of the locking hook.

The guide slot may include: a guide groove extending in the lateral direction; and a guide bump protruded at an end of the guide groove; and the slide leg may include a locking portion inserted into the guide groove configured to slide along the guide groove, and an extension portion configured to slide inside the guide bump, wherein the extension portion is provided with a smaller width than a width of the locking portion.

The guide bar may include a moving bar extending in a lengthwise direction of the extension portion, and a locking bar configured to extend along the locking portion and correspond to the guide bump, wherein the locking bar is bent at a first end of the moving bar and the locking hook is rotatably provided at a second end of the moving bar.

The guide protrusion of the guide slot may be provided with a protruding pin, wherein the protruding pin is protruded in a direction facing the locking bar of the guide bar.

The locking bump may be provided at a first end of the locking hook, the center of the locking hook is hinged to the extension portion of the slide leg, and a second end of the locking hook is rotatably connected to the moving bar of the guide bar.

The locking hook may include a gap removal slot provided at the second end of the locking hook, wherein the gap removal slot is penetrated by a hook provided at the moving bar.

The tilting frame may be provided with a locking groove at a position where the locking bump of the locking hook is connected to the tilting frame when the tilting motion of the tilting frame is restricted at the sliding frame.

The slide leg may be provided with a seat recess in which the guide bar is seated, the seat recess being provided with a second elastic spring configured to provide an elastic force to the guide bar such that the guide bar is elastically held in the direction in which the sliding frame is drawn out.

The seat recess of the slide leg may be provided with a fixing bump configured to face the guide bar in a direction in which the guide bar moves, and hold an initial position of the guide bar.

The slide casing may include an inner side portion and an outer side portion so as to surround the mobility device, and wherein the tilting frame tiltably hinged to the inner side portion of the slide casing may include: a bottom surface on which the mobility device is seated; and a support surface bent at the bottom space and extending upward from the bottom surface.

The tilting frame may be provided with a third elastic spring connected to the slide casing, such that the tilting frame is tilted upward by the third elastic spring The sliding frame may be provided with a latch, and the door may be provided with a latch keeper configured to engage or disengage the latch.

According to the mobility device storage apparatus for the vehicle having the above-mentioned configuration, since the electric personal mobility device is stored in the door of the vehicle, a user can have more space in the interior or the trunk of the vehicle.

In addition, because a user is able to get the electric personal mobility device out directly from the door of the vehicle, it will be more convenient to the user Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
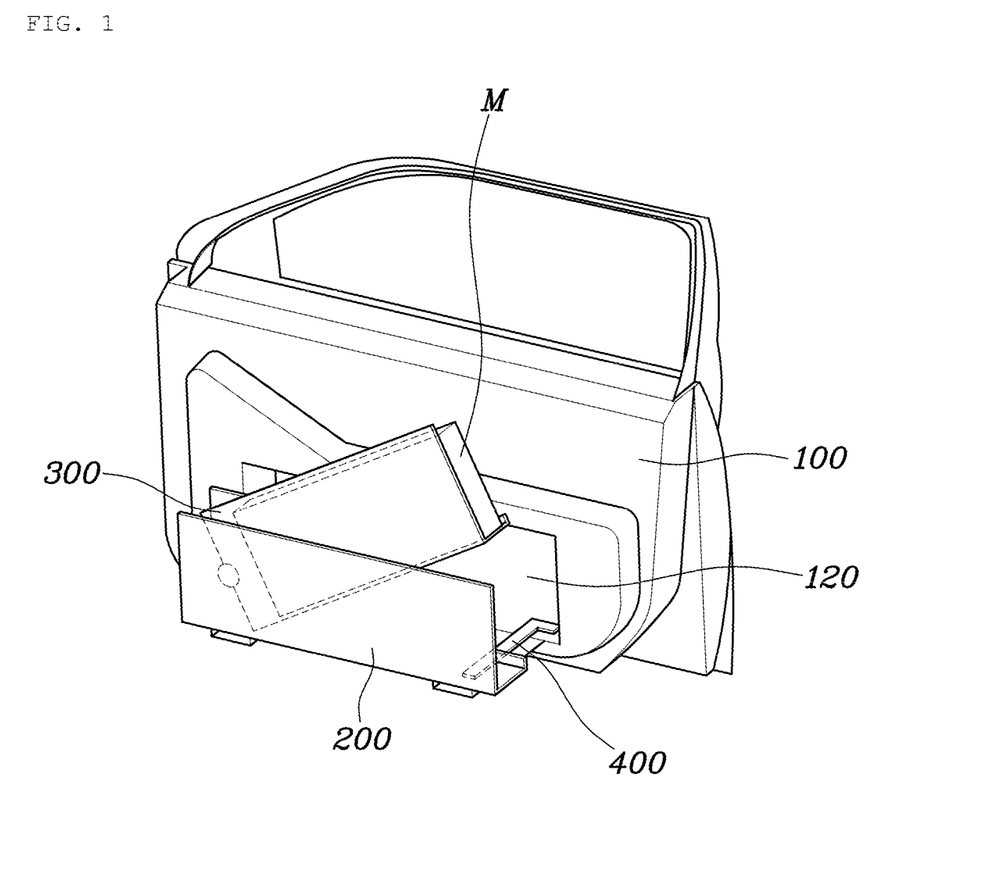
FIG. 1 is a view showing a mobility device storage apparatus for a vehicle.
Figure 6:
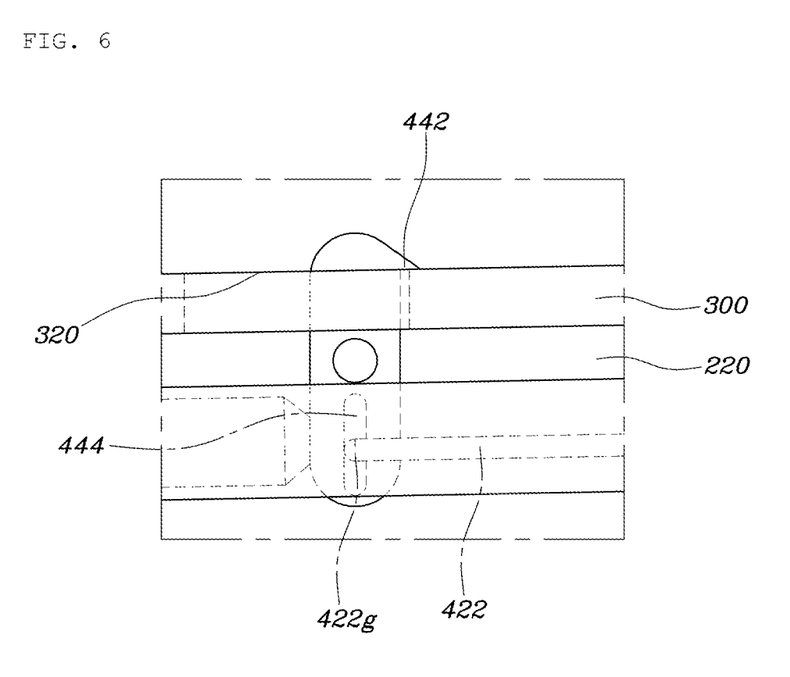
Figure 7:
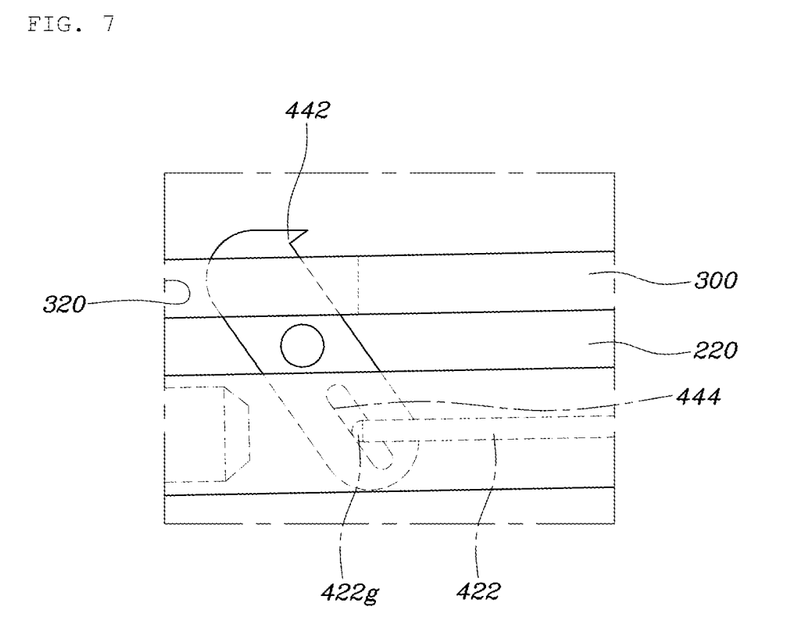
Figure 8:
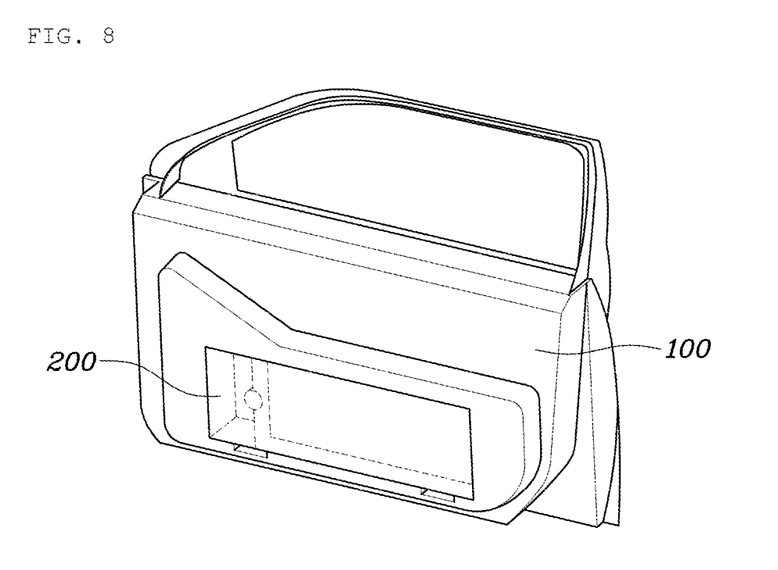
FIGS. 8 to 9 are views showing an operation state of the mobility device storage apparatus for the vehicle shown in FIG. 1.
Figure 9:
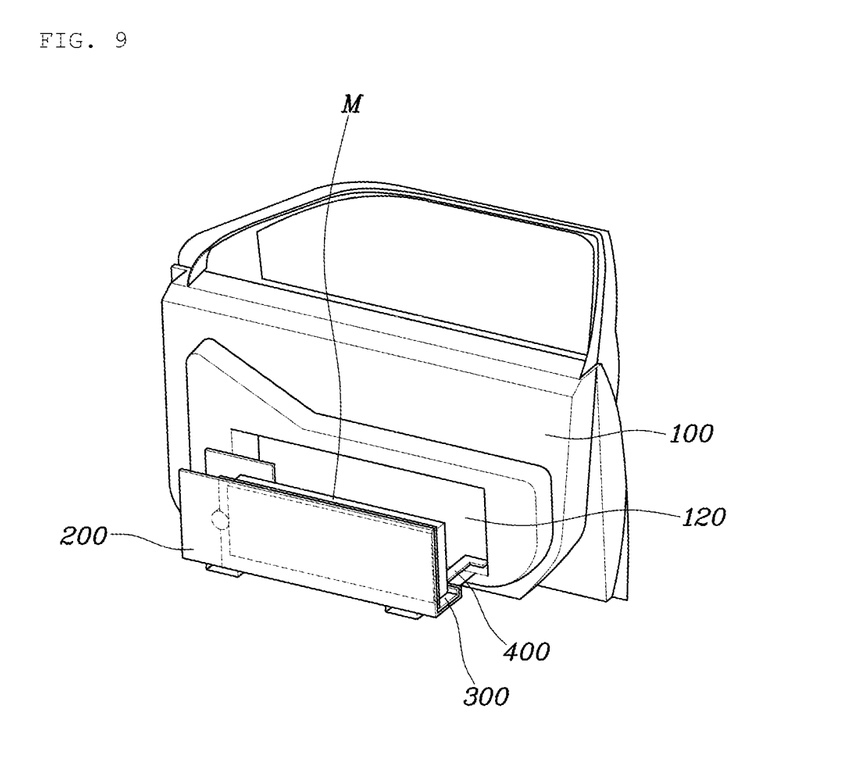

FIG. 1 is a view showing a mobility device storage apparatus for a vehicle in some forms of the present disclosure, FIGS. 2 to 7 are views showing the mobility device storage apparatus for the vehicle shown in FIG. 1, and FIGS. 8 to 9 are views showing an operation state of the mobility device storage apparatus for the vehicle shown in FIG. 1.

The mobility device of the present disclosure is an electric personal mobility device (hereinafter referred to as mobility device) and refers to, for example, a one-wheel or two-wheel electric board. In other words, in some forms of the present disclosure, it is possible to store various types of mobility devices M without being limited to a kickboard type. In addition, according to the type of the mobility device, shapes of a storage space 120 and a slide casing 240 that will be described later may be provided correspondingly to the shape of the mobility device M, such that various types of mobility devices M can be stored.

As shown in FIG. 1, a mobility device storage apparatus for a vehicle in some forms of the present disclosure includes: a door 100 having the storage space 120 provided therein; a sliding frame 200 provided in the storage space 120 to be slidable in a lateral direction and configured to close the storage space 120; a tilting frame 300 provided at the sliding frame 200 to be tiltable in a vertical direction and loaded with the mobility device M; and a locking mechanism 400 provided at the sliding frame 200 and connected to the tilting frame 300, the locking mechanism 400 locking the tilting frame 300 such that a tilting motion of the tilting frame 300 is restricted, wherein when the sliding frame 200 is drawn out of the storage space 120, the locking mechanism 400 unlocks the tilting frame 300 in conjunction with movement of the sliding frame 200 such that the tilting motion of the tilting frame 300 is allowed.

In some forms of the present disclosure, by providing the storage space 120 in the door 100, a user can take the mobility device M out of the door 100 conveniently upon exiting the vehicle, and by using the door 100 as a loading space, occupation of an interior space and a trunk space by the mobility device can be minimized. The storage space 120 of the door 100 is provided with the sliding frame 200 and the tilting frame 300 that will be described later. The tilting frame 300 is selectively tilted by the locking mechanism 400 operated in conjunction with the sliding frame 200.

As a result, when the sliding frame 200 is drawn out of the storage space 120 in the lateral direction, and then the locking mechanism 400 unlocks the tilting frame 300, the tilting frame 300 is tiltable in a vertical direction, thereby being tilted upward. Accordingly, as shown in FIG. 1, the tilting frame 300 is drawn out of and lifted from the door 100, and thus a user can easily take out the mobility device M without bending at the waist.

Figure 2:
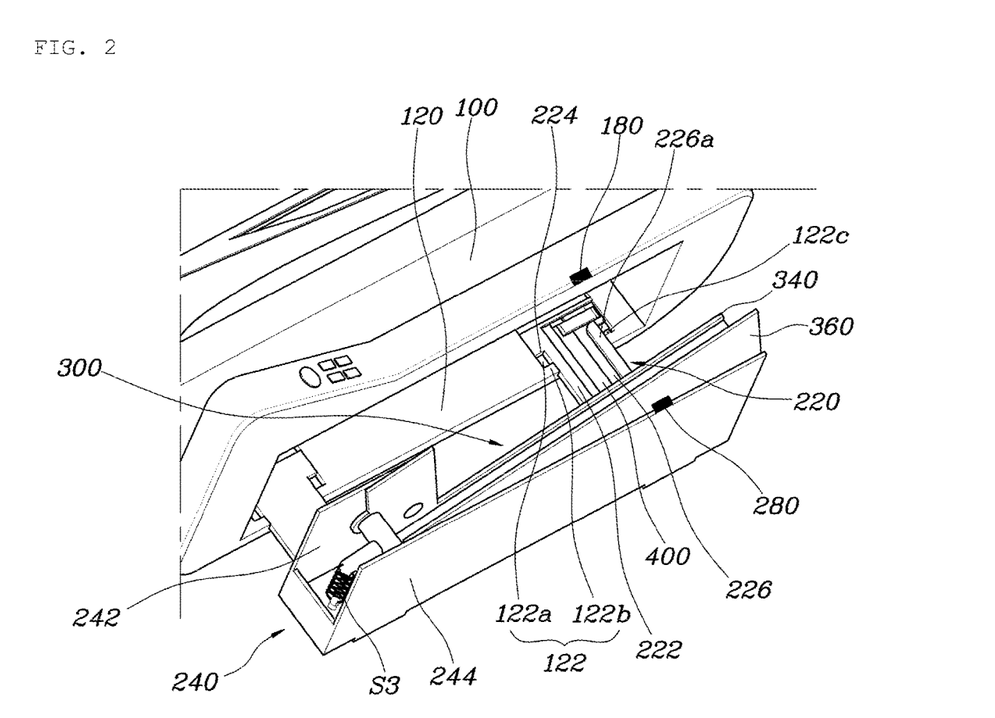
FIGS. 2 to 7 are views showing the mobility device storage apparatus for the vehicle shown in FIG. 1.

Specifically, as shown in FIG. 2, the tilting frame 300 may be provided such that a center of tilting is positioned at an end of the sliding frame 200.

Here, as the storage space 120 is provided in the door 100, the mobility device M loaded in the tilting frame can be taken out conveniently by opening the door 100 upon exiting the vehicle. Further, the sliding frame 200 may be slidably provided at an end of a side of the storage space 120, wherein the side may be an inner side of the door 100. Thus, the sliding frame 200 and the mobility device M loaded in the tilting frame 300 can be easily taken out in a state where the door 100 is opened, thereby improving user convenience.

Figure 3:
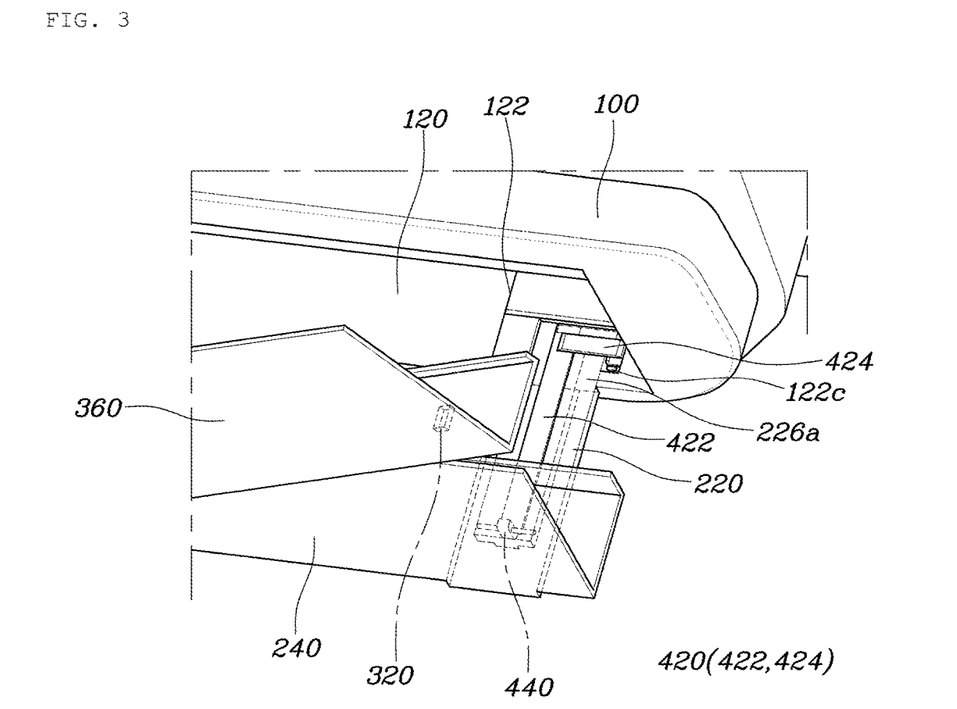

With reference to FIGS. 2 to 3, the storage space 120 may be provided with a guide slot 122 extending in the lateral direction, and the sliding frame 200 may include: a slide leg 220 slidably provided at the guide slot 122, with the locking mechanism 400; and a slide casing 240 coupled to the slide leg 220 and configured to cover the storage space 120.

In other words, the sliding frame 200 includes the slide leg 220 and the slide casing 240, such that the slide leg 220 is slidable in the guide slot 122. The sliding leg 220 is provided with the locking mechanism 400 restricting the tilting motion of the tilting frame 300 such that when the sliding leg 220 is drawn out of the storage space 120, the locking mechanism 400 interlocks with the sliding leg 220 to allow a tilting motion of the tilting frame 300. The interlocking relationship with the slide leg 220 and the locking mechanism 400 will be described in detail hereinafter. The slide casing 240 coupled to the slide leg 220 is provided to cover and close the storage space 120 and may be provided to correspond to a shape of an inner side of the door 100.

Here, the guide slot 122 may be provided with a first elastic spring S1 connected to the slide leg 220 and elastically biasing the slide leg 220 in a direction the slide leg 220 slides.

As described above, as the guide slot 122 is provided with the first elastic spring S1 elastically biasing the slide leg 220, the slide leg 220 slides in the lateral direction by receiving an elastic force in the direction in which the slide leg 220 slides. Accordingly, the sliding frame 200 can be automatically drawn out of the storage space 120 in the lateral direction by the first elastic spring S1.

In addition, the sliding frame 200 may be provided with a latch 280, and the door 100 may be provided with a latch keeper 180 engaged with or disengaged from the latch 280.

As shown in FIG. 2, in the sliding frame 200, the slide casing 240 is provided with the latch 280, and when the latch 280 is engaged with the latch keeper 180 provided at the door 100, the sliding frame 200 is prevented from being drawn out of the storage space 120. When the latch 280 is released, the sliding frame 200 is allowed to be drawn out, and thus the sliding frame 200 can be drawn out of the storage space 120 by automatically sliding by the elastic force of the first elastic spring S1. Here, the latch 280 and the latch keeper 180 may use a well-known latch structure, and various locking structures such as a push latch may be selectively used. The latch 280 and the push latch are conventional techniques, so a detailed description thereof is omitted.

Thus, the sliding frame 200 slides in the lateral direction by the elastic force of the first elastic spring S1. In particular, in some forms of the present disclosure, a position of the mobility device M is tilted by the tilting frame 300 provided at the sliding frame 200 to be tiltable in the vertical direction, thereby improving user convenience. Here, the tilting frame 300 is allowed to be tilted upward after the sliding frame 200 is drawn out, so the tilting motion of the tilting frame 300 in the vertical direction is restricted by the locking mechanism 400. An unlocking operation of the locking mechanism 400 will be described in detail below.

Figure 4:
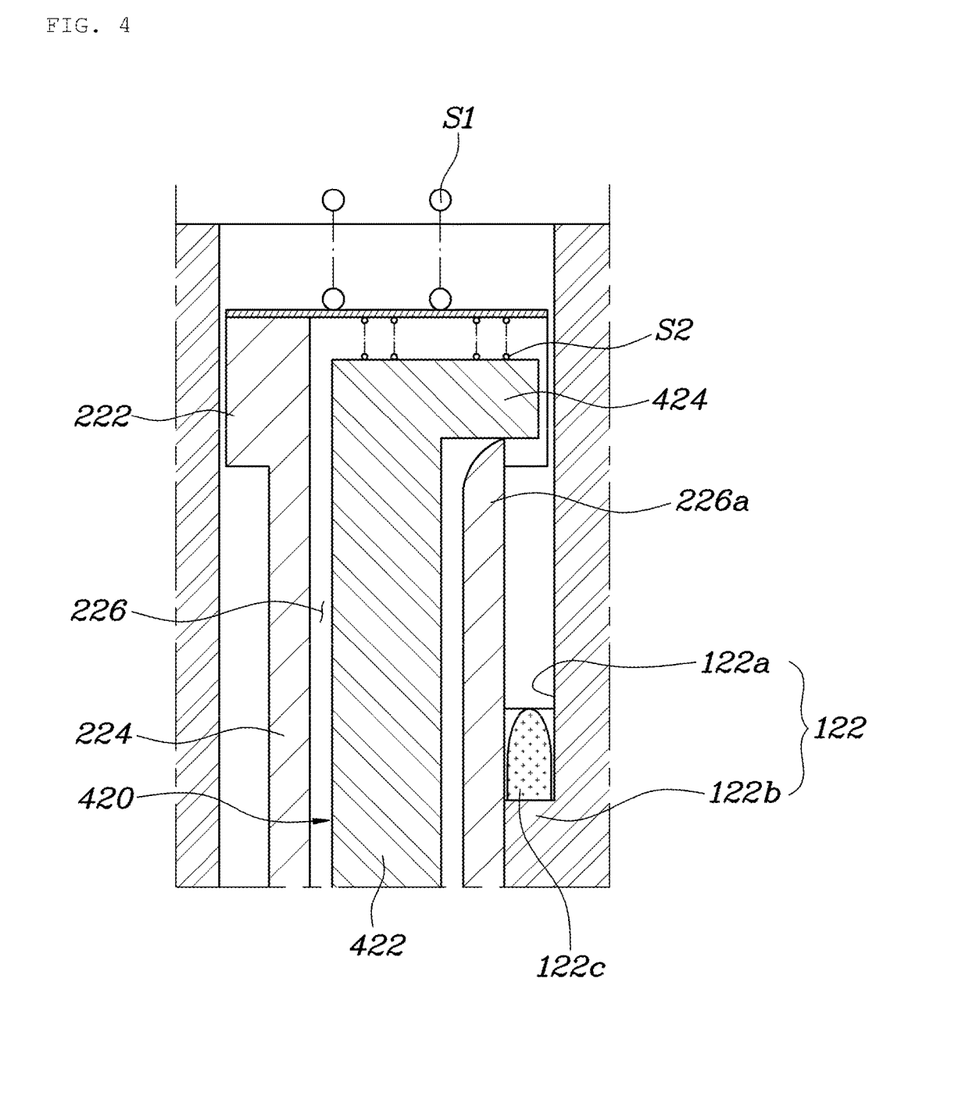
Figure 5:
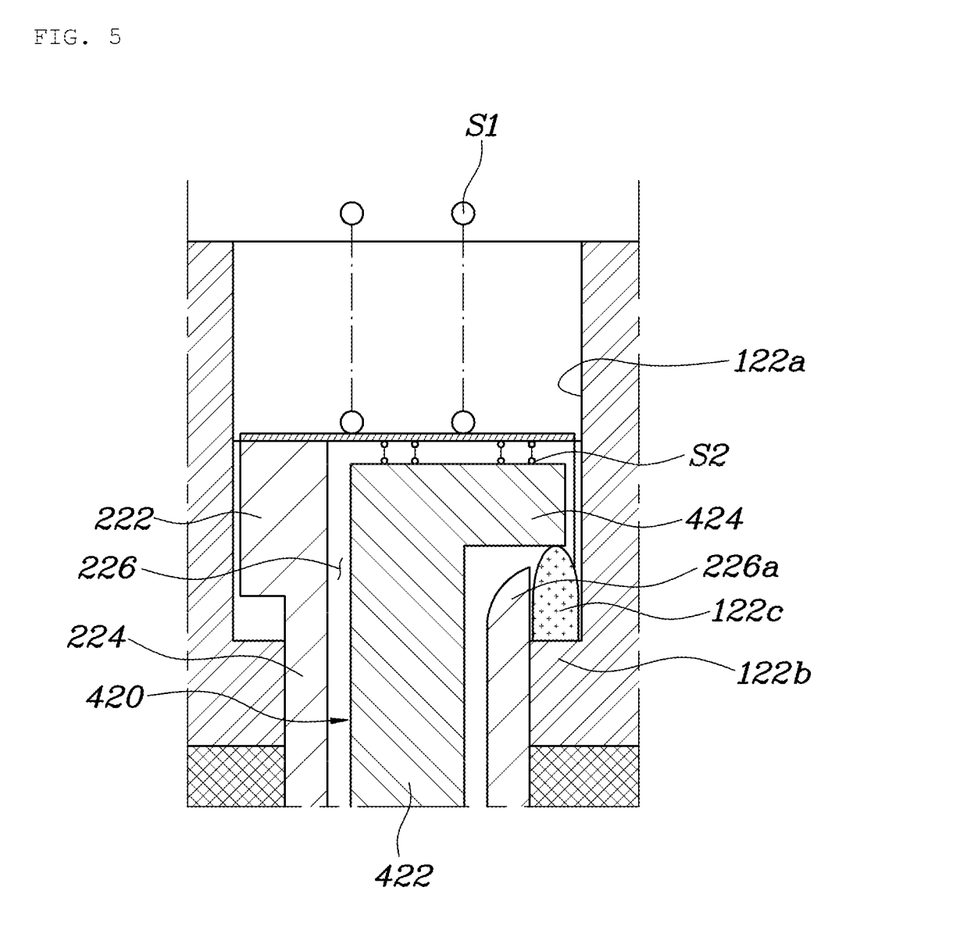

The locking mechanism 400, as shown in FIGS. 3 to 5, includes: a guide bar 420 movably provided at the slide leg 220 and configured to be locked to the guide slot 122 when the sliding frame 200 is drawn out; and a locking hook 440 rotatably provided at the slide leg 220 and to which the guide bar 420 is connected, the locking hook 440 being engaged with or disengaged from the tilting frame 300 in accordance with a rotation of the locking hook.

As described above, the locking mechanism 400 includes the guide bar 420 and the locking hook 440, wherein the guide bar 420 is moved together with the slide leg 220, and when the slide leg 220 slides to a predetermined level, the guide bar 420 is positionally fixed by being brought into contact with the guide slot 122 but only the slide leg 220 is moved. In other words, when the slide leg 220 slides in the guide slot 122, the guide bar 420 is brought into contact with the guide slot 122 and thus a positional difference occurs between the guide bar 420 and the slide leg 220. Accordingly, the locking hook 440 rotatably provided at the guide bar 420 is rotated by the positional difference and is disengaged from the tilting frame 300, such that the tilting frame 300 is allowed to be tiltable.

Specifically, as shown in FIGS. 3 to 4, the guide slot 122 includes a guide groove 122a extending in the lateral direction and a guide protrusion 122b protruding from an end of the guide groove 122a. The slide leg 220 includes a locking portion 222 inserted into the guide groove 122a and sliding along the guide groove 122a, and an extension portion 224 extending from the locking portion 222 with a width smaller than that of the locking portion 222 such that the extension portion 224 slides inside the guide protrusion 122b.

As a result, the slide leg 220 can slide as the locking portion 222 slides in the guide groove 122a and the extension portion 224 slides inside the guide protrusion 122b. Here, the guide protrusion 122b is formed to be smaller than the guide groove 122a in width such that the locking portion 222 of the slide leg 220 is brought into contact with the guide protrusion 122b, thereby preventing separation of the slide leg 220.

Here, the guide bar 420 includes a moving bar 422 extending in a lengthwise direction of the extension portion 224 and a locking bar 424 bent at a first end of the moving bar 422 and extending along the locking portion 222 to correspond to the guide protrusion 122b, wherein the locking hook 440 may be rotatably provided at a second end of the moving bar 422.

As shown in FIG. 3, the guide bar 420 includes the moving bar 422 provided to correspond to the locking portion 222 of the slide leg 220 and the locking bar 424 provided to correspond to the extension portion 224, such that the locking bar 424 of the guide bar 420 can be brought into contact with the guide protrusion 122b of the guide slot 122 by being moved in conjunction with sliding movement of the slide leg 220.

In particular, the locking hook 440 engaged with the tilting frame 300 is rotatably provided at the moving bar 422 such that when the locking bar 424 is brought into contact with the guide protrusion 122b by being moved in conjunction with the sliding movement of the slide leg 220, the moving bar 422 is moved on the slide leg 220 and thus the locking hook 440 can be rotated. In other words, the locking hook 440 is rotated in conjunction with the movement of the slide leg 220 to be engaged with or disengaged from the tilting frame 300.

Here, as shown in FIGS. 3 to 4, the guide protrusion 122b of the guide slot 122 may be provided with a protruding pin 122c protruding in a direction facing the locking bar 424 of the guide bar 420. As such, since the protruding pin 122c protrudes from the guide protrusion 122b, when the slide leg 220 slides, the locking bar 424 of the guide bar 420 is brought into contact with the protruding pin 122c before the locking protrusion 222 of the slide leg 220 is brought into contact with the guide protrusion 122b, and thus a position of the locking bar 424 can be restricted.

In other words, when the slide leg 220 slides in the guide slot 122, the locking bar 424 of the guide bar 420 is brought into contact with the protruding pin 122c to restrict the position of the locking bar, while the slide leg 220 is further moved to the guide protrusion 122b, thereby resulting in occurrence of the positional difference between the guide bar 420 and the slide leg 220. Due to this positional difference, the locking hook 440 provided at the moving bar 422 of the guide bar 420 can be rotated.

The rotation of the locking hook 440 according to the positional difference between the slide leg 220 and the guide bar 420 will be described in detail. The locking hook 440 may be provided at a first end thereof with a locking jaw 442, may be hinged at a center thereof to the extension portion 224 of the slide leg 220, and may be rotatably connected at a second end thereof to the moving bar 422 of the guide bar 420.

As shown in FIGS. 3 to 6, the center of the locking hook 440 is hinged to the extension portion 224 of the slide leg 220, and the second end of the locking hook 440 is rotatably connected to the moving bar 422 of the guide bar 420, such that the locking hook can be rotated by the positional difference between the slide leg 220 and the guide bar 420. In other words, as described above, when the guide bar 420 is moved together with the slide leg 220, the guide bar 420 is brought into contact with the protruding pin 122c and is restricted in position, while the slide leg 220 is further moved to be brought into contact with the guide protrusion 122b. Accordingly, a pulling force is generated at the second end of the locking hook 440, thereby acting to rotate the locking hook 440.

Here, the locking hook 440 may be provided at the second end thereof with a gap removal slot 444, and the moving bar 422 may be provided with a hook 422g connected to the gap removal slot 444 by passing therethrough. As such, since the hook 422g of the moving bar 422 is connected to the gap removal slot 444 of the locking hook 440, the gap generated in accordance with the positional difference between the slide leg 220 and the guide bar 420 is removed, and thus operation of the locking hook 440 can be efficiently performed.

Meanwhile, the tilting frame 300 is provided with a locking groove 320 at a position where the locking jaw 442 of the locking hook 440 is connected to the tilting frame when the tilting frame 300 is restricted from being tilted at the sliding frame 200. Thus, the tilting motion of the tilting frame 300 is restricted when the locking jaw 442 is inserted into the locking groove 320 of the tilting frame 300, whereas the tilting motion of the tilting frame 300 is allowed when the locking jaw 442 is released from the locking groove 320 as the locking hook 440 is rotated.

In addition, the slide leg 220 is provided with a seat recess 226 in which the guide bar 420 is seated, and the seat recess 226 is provided with a second elastic spring S2 such that the guide bar 420 may be elastically biased in the direction in which the sliding frame 200 is drawn out.

As shown in FIG. 3, the slide leg 220 is provided with the seat recess 226 such that the guide bar 420 is movable in the seat recess 226. In particular, the seat recess 226 is provided with the second elastic spring S2 such that the guide bar 420 is moved in the direction in which the sliding frame 200 is drawn out.

Here, the seat recess 226 of the slide leg 220 may be provided with a fixing protrusion 226a protruding to face the guide bar 420 in a direction in which the guide bar 420 moves, and restricting an initial position of the guide bar 420. Accordingly, the guide bar 420 provided in the seat recess 226 of the slide leg 220 is elastically biased by the second elastic spring S2 and is positionally restricted by the fixing protrusion 226a such that the initial position of the guide bar 420 is restricted at the slide leg 220 without deviation. When the locking bar 424 of the guide bar 420 is brought into contact with the protruding pin 122c of the guide slot 122, the guide bar 420 moves while compressing the second elastic spring S2, and thus the positional difference with respect to the slide leg 220 is generated.

Meanwhile, as shown in FIG. 2, the slide casing 240 includes an inner side portion 242 and an outer side portion 244 so as to surround the mobility device M. Here, the tilting frame 300 is tiltably hinged to the inner side portion 242 of the slide casing 240, and the outer side portion 244 forms the inner side of the door 100 in accordance with the design of the door 100.

The tilting frame 300 includes a bottom surface 340 on which the mobility device M is seated and a support surface 360 extending upward from the bottom surface 340 such that when the tilting frame 300 is tilted, the mobility device M can be lifted on the bottom surface 340 and can be supported by the support surface 360 so as not to fall off.

In addition, as shown in FIGS. 2 to 4, the tilting frame 300 is provided with a third elastic spring S3 connected to the slide casing 240, such that the tilting frame 300 can be tilted upward. As such, the tilting frame 300 is tilted upward by an elastic force of the third elastic spring S3 connected to the slide casing 240, such that when the tilting frame 300 is allowed to be tiltable at the sliding frame 200, the tilting frame 300 is automatically tilted upward, thereby improving usability and merchantability.

Accordingly, the third elastic spring S3 may use a compression spring, and is connected to an end of the tilting frame 300 such that the tilting frame 300 is tilted by a restoring force of the third elastic spring S3.

The operation of the present disclosure described above will be described below.

As shown in FIG. 8, the sliding frame 200 and the tilting frame 300 loaded with the mobility device M are placed in the storage space 120. In this state, when a user operates the latch 280 to be disengaged from the latch keeper 180 provided at the door 100, the first elastic spring S1 presses the slide leg 220 with the elastic force such that the slide leg 220 slides in the guide slot 122. Accordingly, as shown in FIG. 9, the sliding frame 200 is drawn out of the storage space 120.

However, in some forms of the present disclosure, when the sliding frame 200 is completely drawn out, the tilting frame 300 is automatically tilted. In other words, as shown in FIG. 5, when the slide leg 220 slides in the guide slot 122 by the elastic force of the first elastic spring S1, the guide bar 420 provided at the slide leg 220 is moved together with the slide leg 220. Here, the protruding pin 122c protrudes from the guide protrusion 122b of the guide slot 122 such that the locking bar 424 is in contact with the protrusion pin 122c and thus the position of the guide bar 420 is restricted, and the second elastic spring S2 is further moved in the direction in which the locking portion 222 is brought into contact with the guide protrusion 122b while the second elastic spring S2 is compressed by the elastic force of the first elastic spring S1.

Accordingly, the positional difference is generated between the slide leg 220 and the guide bar 420, and as shown in FIG. 6, the locking hook 440 provided at the moving bar 422 of the guide bar 420 is hinged at the center thereof to the slide leg 220 and is connected at the end thereof to the moving bar 422, such that as shown in FIG. 7, the locking hook 440 is rotated about the center thereof by the pulling force of the moving bar 422. As the locking hook 440 is rotated, the locking jaw 442 provided at the locking hook 440 is released from the locking groove 320 of the tilting frame 300, and thus the tilting frame 300 is allowed to be tiltable, thereby being tilted upward by the elastic force of the third elastic spring S3. As a result, as shown in FIG. 1, the mobility device M can be easily taken out, thereby improving the usability and the merchantability.

As described above, in some forms of the present disclosure, when the sliding frame 200 is completely drawn out after the sliding frame 200 is automatically drawn out of the storage space 120 of the door 100, the tilting frame 300 is automatically tiltable and thus the mobility device M can be easily taken out and the merchantability of the mobility device can be improved.

According to the mobility device storage apparatus for a vehicle having the above-described structure, since the electric personal mobility device is stored in the door 100 of the vehicle, a user can secure more space in the interior or the trunk of the vehicle.

In addition, because a user is able to get the electric personal mobility device out directly from the door 100 of the vehicle, it will be more convenient to the user.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A storage apparatus for a mobility device in a vehicle, the apparatus comprising:
   a door having a storage space therein;
   a sliding frame provided in the storage space configured to:
      slide in a lateral direction; and
      close the storage space;
   a tilting frame provided at the sliding frame that is configured to tilt in a vertical direction, wherein the tilting frame is loaded with the mobility device; and
   a locking mechanism provided at the sliding frame and connected to the tilting frame, the locking mechanism configured to:
      lock the tilting frame such that a tilting motion of the tilting frame is restricted; and
      when the sliding frame is drawn out of the storage space, unlock the tilting frame corresponding to movement of the sliding frame such that the tilting motion of the tilting frame is allowed.

2. The apparatus of claim 1, wherein a center of the tilting frame is positioned at an end of the sliding frame.

3. The apparatus of claim 1, wherein the storage space comprises:
   a guide slot extending in the lateral direction; and
   the sliding frame further comprises:
      a slide leg provided at the guide slot that is configured to slide, wherein the slide leg is provided with the locking mechanism; and
      a slide casing coupled to the slide leg and configured to cover the storage space.

4. The apparatus of claim 3, wherein the guide slot is provided with a first elastic spring connected to the slide leg, and wherein the guide slot is configured to elastically hold the slide leg in a direction that the slide leg is drawn out.

5. The apparatus of claim 3, wherein the locking mechanism comprises:
   a guide bar configured to move along the slide leg, wherein the guide bar is locked to the guide slot when the sliding frame is drawn out; and
   a locking hook rotatably provided at the slide leg and being connected to the guide bar, wherein the locking hook is configured to engage or disengage the tilting frame corresponding to a rotation of the locking hook.

6. The apparatus of claim 5, wherein the guide slot comprises:
   a guide groove extending in the lateral direction; and
   a guide bump protruded at an end of the guide groove; and
   wherein the slide leg further comprises:
      a locking portion inserted into the guide groove configured to slide along the guide groove; and
      an extension portion extending from the locking portion configured to slide inside the guide bump, wherein the extension portion is provided with a smaller width than a width of the locking portion.

7. The apparatus of claim 6, wherein the guide bar comprises:
   a moving bar extending in a lengthwise direction of the extension portion; and
   a locking bar configured to extend along the locking portion and correspond to the guide bump, wherein the locking bar is bent at a first end of the moving bar and the locking hook is rotatably provided at a second end of the moving bar.

8. The apparatus of claim 7, wherein the guide bump of the guide slot is provided with a protruding pin, wherein the protruding pin is protruded in a direction facing the locking bar of the guide bar.

9. The apparatus of claim 7, wherein a locking jaw is provided at a first end of the locking hook, the center of the locking hook is hinged to the extension portion of the slide leg, and a second end of the locking hook is rotatably connected to the moving bar of the guide bar.

10. The apparatus of claim 9, wherein the locking hook further comprises:
   a gap removal slot provided at the second end of the locking hook, wherein the gap removal slot is penetrated by a hook bar provided at the moving bar.

11. The apparatus of claim 9, wherein the tilting frame is provided with a locking groove at a position where the locking jaw of the locking hook is connected to the tilting frame when the tilting motion of the tilting frame is restricted at the sliding frame.

12. The apparatus of claim 3, wherein the slide leg further comprises:
   a seat recess where the guide bar is seated, wherein the seat recess is provided with a second elastic spring configured to provide an elastic force to the guide bar such that the guide bar is elastically held in the direction that the sliding frame is drawn out.

13. The apparatus of claim 12, wherein the seat recess of the slide leg is provided with a fixing protrusion,
   wherein the fixing protrusion is configured to:
      face the guide bar in a direction in which the guide bar moves, and
      hold an initial position of the guide bar.

14. The apparatus of claim 3, wherein the slide casing comprises an inner side portion and an outer side portion to surround the mobility device, and
   wherein the tilting frame tiltably hinged to the inner side portion of the slide casing comprises:
      a bottom surface on which the mobility device is seated; and
      a support surface bent at the bottom space and extending upward from the bottom surface.

15. The apparatus of claim 3, wherein the tilting frame is provided with a third elastic spring connected to the slide casing such that the tilting frame is tilted upward by the third elastic spring.

16. The apparatus of claim 1, wherein the sliding frame is provided with a latch, and the door is provided with a latch keeper, wherein the latch keeper is configured to engage or disengage the latch.

* * * * *